United States Patent [19]
Schultz et al.

[11] Patent Number: 5,172,608
[45] Date of Patent: Dec. 22, 1992

[54] JOINT CONNECTION WITH A SPRING CLIP AND NUT

[75] Inventors: John C. Schultz, Saline; John D. Beres, III, Ann Arbor; Lee R. Krahn, Dexter; Victor M. Rose's, Ypsilanti, all of Mich.

[73] Assignee: General Motors Corporation, Detroit, Mich.

[21] Appl. No.: 704,239

[22] Filed: May 22, 1991

[51] Int. Cl.⁵ .................. G905 1/00; F16F 15/10; F16B 39/284
[52] U.S. Cl. ......................... 74/572; 74/574; 24/295; 403/320; 403/337; 411/112
[58] Field of Search ............... 74/572, 573 R, 574, 74/573 F; 24/295, 525; 403/320, 11, 335, 337; 411/111, 112, 113, 104, 84, 85; 192/111 A

[56] References Cited

U.S. PATENT DOCUMENTS

| | | | |
|---|---|---|---|
| 2,159,573 | 5/1939 | Tinnerman | 411/112 |
| 2,258,342 | 10/1941 | Tinnerman | 411/112 |
| 2,390,752 | 12/1945 | Tinnerman | 411/112 |
| 4,729,706 | 3/1988 | Peterson et al. | 411/112 X |
| 4,791,829 | 12/1988 | Fukushima et al. | 74/574 |
| 4,848,554 | 7/1989 | Fukaya | 192/111 A X |
| 4,852,424 | 8/1989 | Grassmuck et al. | 74/572 X |
| 5,029,687 | 7/1991 | Asada et al. | 192/111 A |
| 5,067,206 | 11/1991 | Metcalfe | 24/295 X |
| 5,090,536 | 2/1992 | Asada | 192/111 A |
| 5,094,329 | 3/1992 | Maguire | 74/572 X |

FOREIGN PATENT DOCUMENTS

| | | | |
|---|---|---|---|
| 44-3124 | 8/1969 | Japan | 192/111 A |
| 537644 | 6/1941 | United Kingdom | 24/295 |

*Primary Examiner*—Vinh T. Luong
*Attorney, Agent, or Firm*—Donald F. Scherer

[57] ABSTRACT

A joint connection for rotating members has a fastener and nut for securing the members together. A spring clip and a lug are provided to position and retain the nut on one element for ease of assembly. The spring clip has a pair of radially inwardly extending spring arms which are connected to the main body of the spring clip by respective inwardly facing concave portions.

6 Claims, 1 Drawing Sheet

JOINT CONNECTION WITH A SPRING CLIP AND NUT

BACKGROUND OF THE INVENTION

This invention relates to joint connections, and more particularly, to rotating joint connections. The invention specifically relates to rotating joint connections having a spring element for positioning a nut prior to assembly, and wherein the spring element is subjected to centrifugal forces.

In proposed prior art rotating joint spring clips for torque converter to engine connections, the spring arms extend radially outward from the clip portion which connects the arms to the main body. When the spring clip is subjected to centrifugal forces during rotation, the spring arms will be subjected to a resultant force which causes the spring arms to deform in a direction to reduce the spring load. This results in significant loading and unloading of the spring clips, thereby imposing fatigue factors on the spring arms which are the limiting life factor for a product. Since this result is not satisfactory, prior art structure have utilized a yielding operation to secure the nut to the torque converter shell.

SUMMARY OF THE INVENTION

The present invention has a spring clip which is adapted to position a nut within a lug member prior to assembly. The spring clip has a pair of spring arms which react against a plate member to maintain the nut positioned within the lug. The spring arms extend radially inward when the members are joined together such that resulting centrifugal forces tend to increase the spring load which is reacted or absorbed by the one member. This reduces the amount of flexing which the spring undergoes during operation thereby reducing the fatigue stress and increasing the life of the product.

The lug has sloping side walls between which the nut is disposed. The space between the side walls is sufficient to accept the nut with a minimum amount of rotary free play. Thus, during engagement and disengagement of a threaded fastener, rotation of the nut is inhibited and completion of the connection between the engine and torque converter is greatly facilitated.

It is therefore an object of this invention to provide an improved rotating joint connection, wherein a spring clip is used to position a nut in a manner to increase the spring force as the rotary speed increases.

It is therefore an object of this invention to provide an improved rotating joint connection between the torque converter and an engine wherein, a spring clip and a lug are utilized to position and retain a nut in a manner to increase the spring force as the rotary speed of the connection increases, and further to inhibit relative rotation of the nut and lug during engagement with a threaded fastener.

It is a further object of this invention to provide an improved rotating joint connection having a nut positioned by a spring clip including a pair of arms and a fastener secured in the nut, wherein the fatigue load on the arms is reduced.

These and other objects and advantages of the present invention will be more apparent from the following description and drawings.

DESCRIPTION OF THE PREFERRED EMBODIMENT

Figure 1:
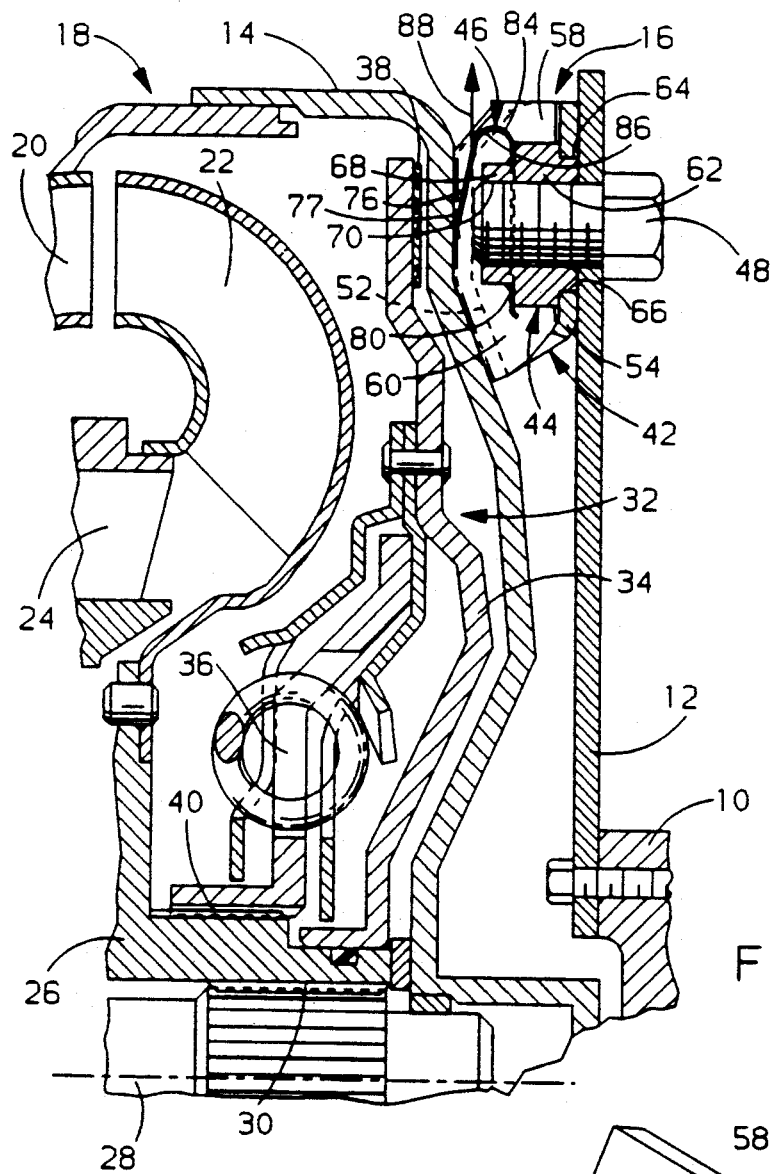
FIG. 1 is a cross-sectional elevational view of a portion of a torque converter and flex plate assembly having a joint connection incorporating the present invention.

Referring to the drawings, wherein like characters represent the same or corresponding parts throughout the several views, there is seen an engine crankshaft 10 to which is secured a conventional drive plate or flex plate 12. The flex plate 12 is secured to a driven plate or input shell 14 through a plurality of joint connections, such as 16.

A conventional torque converter 18 is operatively connected with the input shell 14 and includes an impeller 20 which is drivingly connected to the input shell 14, a turbine 22 and a stator 24 which are in toroidal fluid flow relation with the impeller 20. The turbine 22 has an output hub 26 which is connected to an output shaft 28 through a spline connection 30. The torque converter 18 is a conventional device and operates in a well known manner to transmit power from the crankshaft 10 to the output shaft 28.

Also disposed within the input shell 14 is a torque converter clutch generally designated 32 which includes a clutch plate 34 and a damper assembly 36. The clutch plate 34 has a friction facing 38 which is selectively frictionally engaged with the input shell 14 to provide a direct drive connection between the input shell 14 and the output shaft 28. The clutch plate 34 is slidably supported on the hub 26 and the damper assembly 36 is drivingly connected through a spline 40 to the hub 26. As is well known, the damper assembly 36 is operable to reduce the engine torsional vibrations which is present at the crankshaft 10 and are not desirable at the output shaft 28.

The joint connection 16 includes a lug 42 which is welded or otherwise secured to the input shell 14, a nut 44, a spring clip 46 and a threaded fastener 48.

Figure 2:
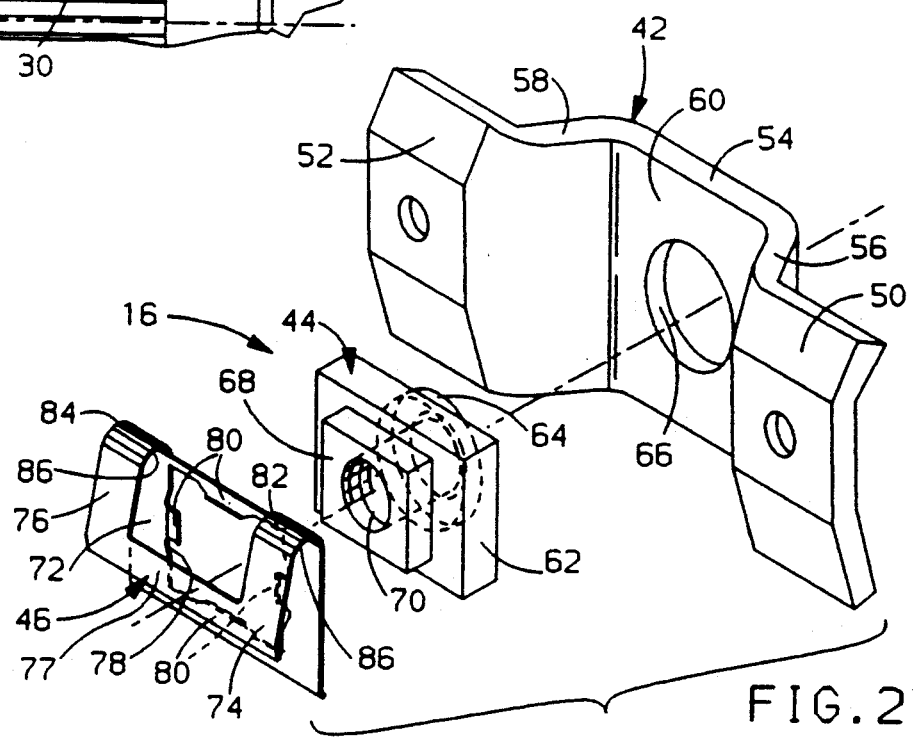
FIG. 2 is an expanded isometric view of a portion of the joint connection shown in FIG. 1.

As best seen in FIG. 2, the lug 42 has a pair of legs 50, 52 which are secured to the input shell 14. The legs 50, 52 are joined with a central wall portion 54 by a pair of side walls 56 and 58. The side walls 56, 58 and wall 54 cooperate to form a recess 60 in which the main body 62 of the nut 44 is disposed. The nut 44 has a central protuberance 64 which is inserted in a central opening 66 formed in the wall 54. The nut 44 also has a locating block 68 which extends from the body 62 in a direction opposite to the protuberance 64. An axially extending threaded opening 70 extends through the nut 44 and is adapted to be engaged by the threaded fastener 48.

The side walls 56 and 58 are spaced sufficiently far apart to permit free insertion of the nut 44 and spring clip 46 in the recess 60. However, when the nut 44 is disposed within the recess 60, the side walls 56 and 58 will limit the rotation of the nut 44 relative to the lug 42. This facilitates the use of a simple tool, such as a wrench, to tighten the bolt 48 within the nut 44 and relieve the operator from engaging a tool with the nut 44.

The spring clip 46 has a main body 72, a pair of spring arms 74 and 76, a nut aperture or opening 78, and a plurality of retainer fingers 80 which extend from the body 72 into the aperture 78. The spring arms 74 and 76 are interconnected and their radially inner ends by a cross bar member 77. This member improves the rigidity of the spring clip 46. However, it has been found that in some assemblies, the cross bar 77 is not required. The spring arms 74, 76 are connected with the main body 72 by respective curved or arcuate connecting portions 82, 84, each of which, as seen in FIG. 1, have a radially inwardly facing concave surface 86. The aperture 78 is adapted to encircle or surround the block 68 and the retainer fingers 80 are adapted to frictionally engage the surfaces of the block 68, thereby retaining the nut 44 with the spring clip 46.

This assembly of the spring clip 46, nut 44 and threaded fastener 48 can be removed by simply unthreading the fastener 48. This will permit decoupling of the flex plate 12 from the input shell 14. After the threaded fastener 48 has been removed, it is a simple matter to compress the spring by depressing the spring arms 74 and 76 sufficiently to withdraw the protuberance 64 from the opening 66 and then sliding the nut 44 in spring clip 46 from the recess 60. Thus, the nut and spring clip assembly is readily replaceable should the nut threads become damaged or for some engineering purpose.

When the nut 44 with the spring clip 46 attached thereto is inserted in the recess 60 between the input shell 14 and the lug 42, the spring arms 74, 76 are disposed in abutment with the input shell 14 and depressed toward the main body 72. This will ensure that the protuberance 64 is positioned in the central opening 66 prior to assembly of the flex plate 12 and input shell 14.

As best seen in FIG. 1, the spring arms 74, 76 extend generally radially inward. During rotation of the torque converter 18 by the engine crankshaft 10, centrifugal forces in the direction of Arrow 88 are imposed on the spring arms 74 and 76. Thus, the force 88 tends to expand the spring arms 74, 76 in a clockwise direction about the main body 72 in an effort to open the concave surface 86. However, since the spring arms 74, 76 are disposed in abutment with the surface of input shell 14, movement in this direction is significantly restricted. Flexing of the spring arms during a rotary motion between high and low speeds is maintained at a minimum thereby preventing excess fatigue forces from being imposed on the connecting portions 82 and 84.

This is in opposition to prior art spring clips, wherein the connection portion is disposed radially inward of the nut such that the spring arms would extend radially outward. With this orientation, those familiar with such devices will recognize that the resulting centrifugal forces would cause the spring arms to reduce the spring load and at sufficient rotary speeds, to separate from the input shell 14. Thus, the prior art spring clips could undergo significant fatigue stress which would have a serious effect on the life of the spring clip.

It will be apparent to those skilled in the art that the present configuration of the spring clip and the rotating joint in general will provide an improved joint connection have a longer life than the prior art devices.

The embodiments of the invention in which an exclusive property or privilege is claimed are defined as follows:

1. A rotating joint connection comprising: a rotatable drive plate; a rotatable driven plate; a nut positioning lug secured to one of said drive and driven plates; nut means disposed in said lug for presenting an axially extending threaded opening; fastener means extending through a first opening in the other of said drive and driven plate and threadably engaging said nut means; spring means for maintaining said nut in said lug prior to engagement by said fastener means, said spring means having a nut engaging portion presenting a second opening for encircling said nut and for securement with said spring means, a spring portion extending radially inward and being axially displaced from the nut engaging portion and abutting the one of said drive and driven plate, and a joining portion integrally connecting said nut engaging portion and said spring portion and having an arcuate portion presenting a concave surface facing radially inward and being positioned radially outward of the nut means.

2. A joint connection joining a rotatable drive plate and a rotatable driven plate, said joint connection comprising: a positioning lug secured to one of said drive and driven plates; nut means disposed in said lug for presenting an axially extending threaded opening; fastener means extending through an opening in the other of said drive and driven plate and threadably engaging said nut means; spring clip means for maintaining said nut in said positioning lug prior to engagement by said fastener means, said spring clip means having a main body portion with an aperture for surrounding said nut means and retainer finger means for enforcing securement of said nut means with said spring clip means, a pair of radially inwardly extending spring arms axially displaced from the main body portion and abutting the one of said drive and driven plate and a joining portion integrally connecting said main body portion and said spring arms and having an concave surface facing radially inward and being positioned radially outward of the nut means.

3. The rotating joint connection defined in claim 2, wherein said pair of radially inward extending spring arms are interconnected at radially inner ends thereof by a transverse bar member.

4. A rotating joint connection comprising: a rotatable drive plate; a rotatable driven plate; a nut positioning lug secured to one of said drive and driven plates, said lug having a pair of spaced side walls and an end wall cooperating with said one drive and driven plate to provide a recess of predetermined width; nut means disposed in said recess formed by said lug for presenting an axially extending threaded opening, said predetermined width being sufficiently narrow to cooperate with said nut means for inhibiting rotation of said nut means within said recess; fastener means extending through an opening in the other of said drive and driven plate and threadably engaging said nut means; spring means for maintaining said nut in said lug prior to engagement by said fastener means, said spring means having a nut engaging portion presenting an opening for encircling said nut and for securement with said spring means, a spring portion extending radially inward and being axially displaced from the nut engaging portion and abutting the one of said drive and driven plate, and a joining portion integrally connecting said nut engaging portion and said spring portion and having an arcuate portion presenting a concave surface facing radially inward and being positioned radially outward of the nut means.

5. The rotating joint connection defined in claim 4, further wherein, said end wall has an opening; said nut means has a protuberance sized to fit in the opening and surrounding said threaded opening and said spring means is effective to urge said nut means against said end wall with said protuberance disposed in said opening.

6. The rotating joint connection defined in claim 5, further wherein, said spring portion is comprised of a pair of spaced arms extending radially inward from said joining portion and a transverse bar portion integral with radially inward ends of said spring arms.

* * * * *